Figure 1:
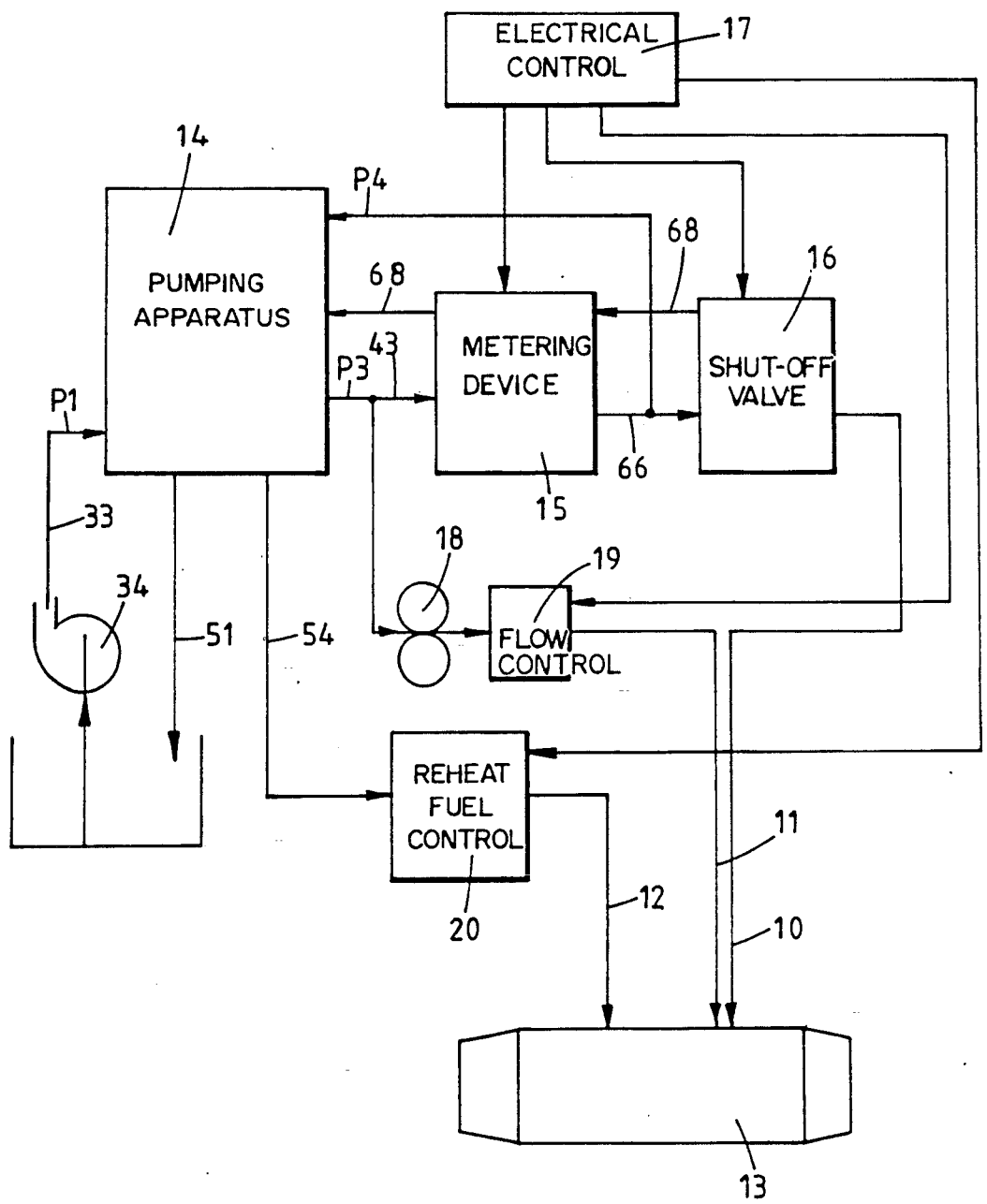

United States Patent [19]
Smith

[11] Patent Number: 5,064,357
[45] Date of Patent: Nov. 12, 1991

[54] FUEL SUPPLY APPARATUS

[75] Inventor: Trevor S. Smith, Sutton Coldfield, Great Britain

[73] Assignee: Lucas Industries public limited company, Birmingham, England

[21] Appl. No.: 470,726

[22] Filed: Jan. 26, 1990

[30] Foreign Application Priority Data

Feb. 10, 1989 [GB] United Kingdom ................. 8903070

[51] Int. Cl.$^5$ ............................................. F04B 23/04
[52] U.S. Cl. ..................................... 417/428; 417/251
[58] Field of Search ............... 417/251, 250, 252, 244, 417/426, 428

[56] References Cited

U.S. PATENT DOCUMENTS

| | | | |
|---|---|---|---|
| 2,532,856 | 12/1950 | Ray | 417/252 |
| 2,826,353 | 3/1958 | Auwarter | 417/428 |
| 2,836,230 | 5/1958 | Crvckshank | 417/252 |
| 3,026,929 | 3/1962 | Burns | 158/36.4 |
| 3,147,712 | 9/1964 | Gaubatz | 417/252 |
| 3,233,651 | 2/1966 | Smith | 417/250 |
| 3,658,440 | 4/1972 | Jackson | 417/62 |
| 3,699,774 | 10/1972 | Davis | 417/426 |
| 3,941,505 | 3/1976 | Nasvytis | 417/252 |
| 4,700,680 | 10/1987 | Pearce | 417/252 |

FOREIGN PATENT DOCUMENTS 771837 4/1957 United Kingdom .
1406245 9/1975 United Kingdom .

Primary Examiner—Richard A. Bertsch
Assistant Examiner—Peter Korytnyk
Attorney, Agent, or Firm—Nixon & Vanderhye

[57] ABSTRACT

A supply passage communicates with the inlet of a first centrifugal pump. A second, smaller centrifugal pump has its outlet connected to a delivery conduit. A valve arrangement is selectively operable to connect the inlet of the second pump either to the output of the first pump or directly to the supply passage, both the inlet and outlet of the first pump being shut off in the latter condition.

5 Claims, 3 Drawing Sheets

FUEL SUPPLY APPARATUS

This invention relates to a fuel supply apparatus and in particular to an apparatus for supplying fuel to a gas turbine engine having both main and reheat burners.

In gas turbine engine fuel systems it has been proposed to use a centrifugal pump as the main source of pressurized fuel. However a centrifugal pump of adequate size for maximum fuel flow will generate excessive heat at low flows.

It is also known from G.B. Patent 1406245 to provide a fuel system having first and second stage centrifugal pumps and to arrange that fuel is supplied either by the first stage pump or by both pumps in series, dependent on the pressure requirement of a metered fuel flow. When the two pumps are operating in series the higher fuel pressure at the inlet of the second stage pump will cause the fuel velocity to be substantially higher at that location than at the first stage pump inlet. The dimensions of the first stage pump are thus generally larger than those of the second stage pump. A main engine fuel control system requires a relatively low fuel flow at maximum high pressure. However, where the engine incorporates a reheat system, the latter system will require a high fuel flow at relatively low pressure. The reheat fuel flow will in that case be derived from the first stage pump, which must be still larger than that required for an engine without a reheat system. A typical engine will require a total fuel flow of up to 7.5 kg/s, but during high altitude cruising will require flows of less than 0.15 kg/s. At low flows a relatively large first stage pump will be inefficient, raising the fuel temperature unacceptably.

It is an object of the invention to provide a fuel supply apparatus in which the above problems are reduced or overcome.

According to the invention there is provided a fuel supply apparatus comprising a first centrifugal pump, a second, smaller centrifugal pump, a supply passage to said first pump, a first delivery conduit, a flow metering device in said delivery conduit, and a valve arrangement operable to a first condition in which an outlet of said first pump communicates with an inlet passage of said second pump and is isolated from said first delivery conduit, and a second condition in which the outlet of said first pump is isolated from the inlet passage of said second pump, said valve arrangement being operable in said second condition to isolate the inlet of said first pump from said supply passage and to connect the inlet passage of said second pump to said supply passage.

Figure 2:
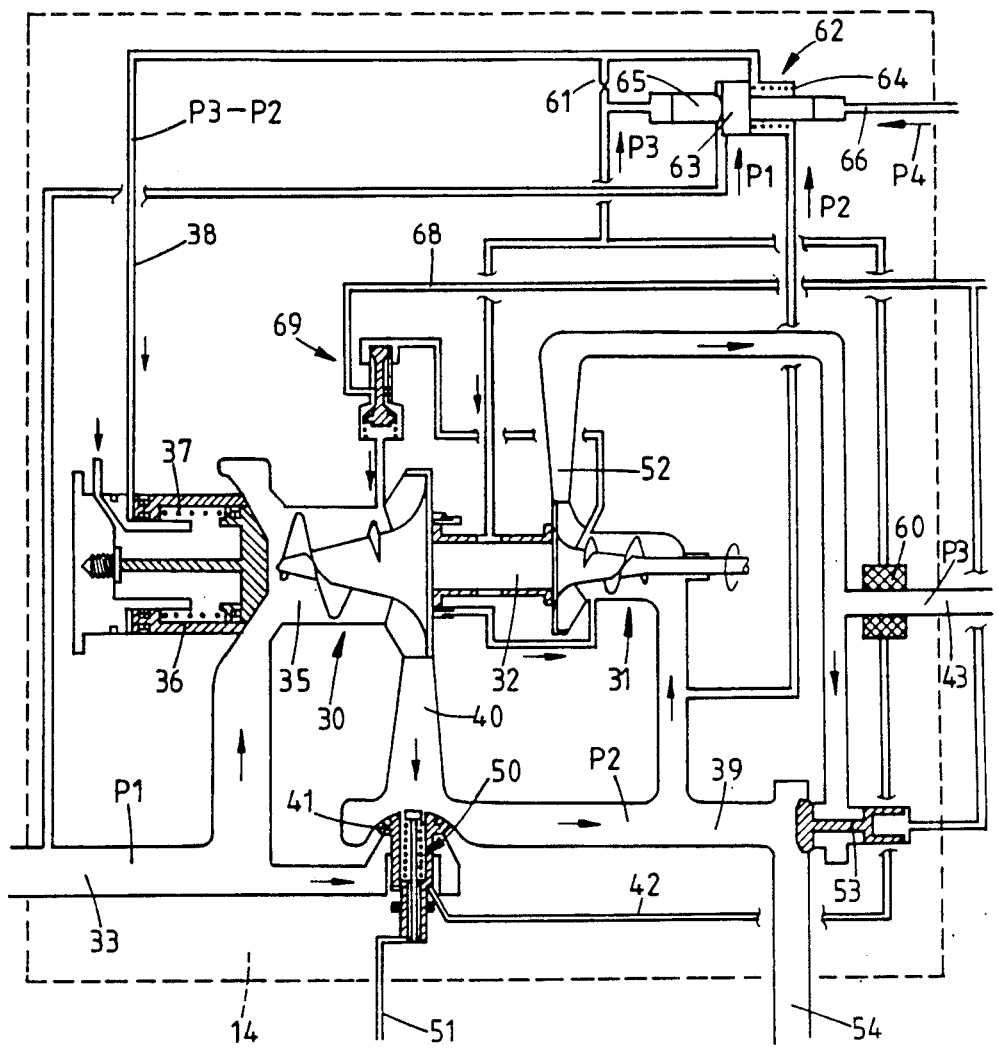
Figure 3:
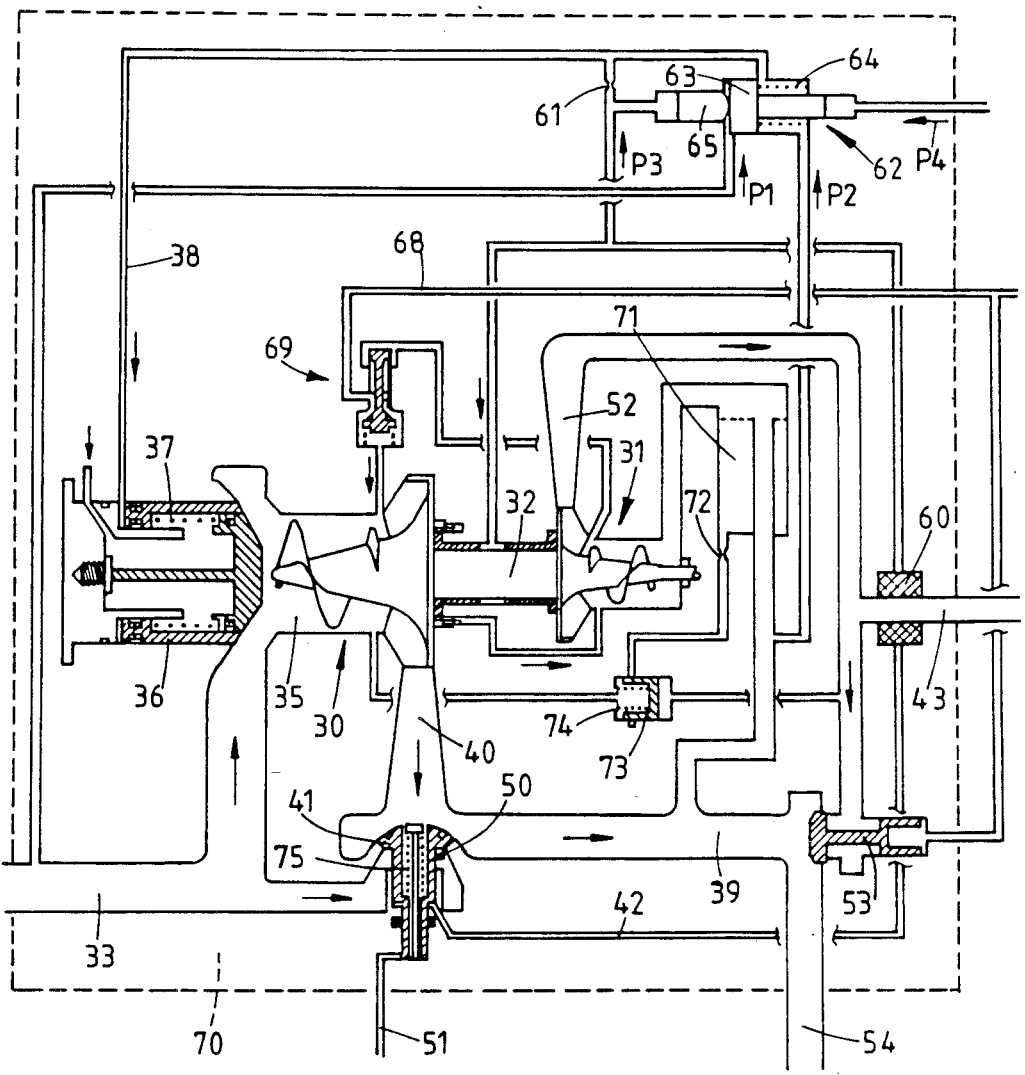

Embodiments of the invention will now be described by way of example only and with reference to the accompanying drawings in which:

FIG. 1 is a block diagram of a fuel control system for main and reheat burners of a gas turbine engine, FIG. 2 is a diagram of a fuel pumping apparatus forming part of FIG. 1, and FIG. 3 is a diagram of an alternative embodiment of the pumping apparatus of FIG. 2.

As shown in FIG. 1 fuel lines 10, 11, 12 communicate with the main burners, pilot burners and reheat burners respectively of a gas turbine engine 13. Fuel is supplied to the line 10 by a pumping apparatus 14 by way of a metering device 15 and a shut-off valve arrangement 16, the device 15 and arrangement 16 being responsive to signals from an electrical control 17. The device 15, arrangement 16 and circuit 17 are of types well known in the art and form no part of the present invention. Fuel is supplied to the line 11 by a gear pump 18 which can draw fuel through the pumping apparatus 14 and discharge it to the line 11 by way of a flow control 19. The flow control 19 is responsive to a signal from the circuit 17 such that fuel is supplied on the line 11 during engine starting. The flow control 19 is also of a conventional type and forms no part of the present invention.

Fuel is supplied on the line 12 from the pumping apparatus 14 by way of reheat fuel control 20 which is also responsive to signals from the circuit 17. The control 20 is also of a known type and forms no part of the present invention.

As shown in FIG. 2 the pumping apparatus 14 comprises a first centrifugal pump 30 and a smaller centrifugal pump 31, each of these pumps including a helical inducer and a bladed impeller. The pumps 30, 31 are mounted on a common shaft 32 driven by a shaft of the engine 13. A supply passage 33 is supplied with fuel by a boost pump 34 (FIG. 1). An inlet 35 of the pump 30 can be isolated from the passage 33 by an annular valve closure element 36 which is operable against a spring 37 by a servo pressure signal in a line 38. An inlet passage 39 for the pump 31 can communicate either with the supply passage 33 or with an outlet 40 of the pump 30, depending on the position of a valve member 41. The member 41 is urged to shut off the outlet 40 by a pressure in a line 42 derived from a delivery conduit 43 of the pumping apparatus 14 as a whole. The member 41 is movable against the pressure in line 42 by the pressure in outlet 40 to isolate the supply passage 33 from the passage 39. The member 41 thus moves to shut the outlet 40 and interconnect the passages 33, 39 when the valve closure 36 shuts off the inlet 35 of the pump 30. The valve member 41 has a through passage 50 which, when the outlet 40 is shut off, communicates with a drain connection 51. In the position (shown) of the member 41, in which the outlet 40 and inlet passage 39 are interconnected, the drain connection 51 is shut off by the member 41. When the inlet 35 of the pump 30 is shut by the element 36 the pump 30 thus drains through the bore 50 and connection 51.

The outlet 52 of the pump 31 communicates with the conduit 43. A slidable valve element 53 has a differential area exposed to the pressure in conduit 43 and a substantially larger area exposed to the pressure in passage 39. A piston portion of the element 53 is exposed to a low pressure in a servo return line 68 from the metering device 15. With the passage 39 and pump outlet 40 interconnected the element 53 moves to a position (shown) in which the passage 39 communicates with a further delivery conduit 54 through which fuel is supplied to the reheat fuel control 20 (FIG. 1). With the outlet 40 shut by the valve member 41 the pressures in passages 33, 39 are equal and the element 53 moves to interconnect the conduits 43 and 54.

The conduit 43 is connected through a series arrangement of a filter 60, a flow restrictor 61 and a servo control valve 62 with the passage 39. The servo pressure line 38 is connected to a zone between the restrictor 61 and valve 62. The valve 62 has a control element 63 which is biased to a fully open position by a spring 64. The control element 63 is movable against the spring 64 by the pressure P1 in the supply passage 33, and by a plunger 65 which is acted on by the pressure P3 in the conduit 43. The element 63 is acted on, in a direction to assist the spring 64, by the pressure P2 in the passage 39 and by a pressure P4 in a part 66 (FIG. 1) of the conduit 43 downstream of the metering device 15.

The travel of the element 63 is relatively small, and over this travel it is arranged that the force applied by the spring 64 corresponds to a required value PM of the metering pressure difference $P3-P4$ of $966\times 10^3$ N/m2. The arrangement is, in general, such that if the sum of the pressures P1 and P3 is less than the sum of the pressures P2, P4 and the required metering pressure difference PM, the control element 63 moves leftward as seen in FIG. 2, reducing the pressure in line 38 and opening the inlet to the pump 30. In this condition therefore:

$$P3-P2<P4-P1+PM \qquad (1)$$

That is, the pressure difference across the pump 31 is less than the sum of the required metering pressure difference PM and the difference between the pressure downstream of the metering device 15 and the pressure in the passage 33.

At low flows, when $P3-P4$ is not less than PM, the pump 31 alone supplies fuel and $P1=P2$. The valve element 53 is thus in a position in which conduit 43 and 54 are interconnected. If high fuel flow is demanded the metering pressure drop $P3-P4$ falls below its required value PM. The condition is thus that indicated in equation (1) above and the valve element 36 opens, the pump 30 delivers fuel. The valve 41 opens and the increased pressure in passage 39 causes the valve element 53 to isolate passage 39 from the conduit 43. Flow from the pump 30 thus passes to the reheat system and to the inlet of pump 31. The larger pump 30 is thus operated only when a high total flow is required.

The pumps 30, 31 then act in series. When the metering pressure difference $P3-P4$ returns to its required value PM the inlet of the pump 30 is shut, its outlet passage 40 is isolated and the pump 31 draws fuel through the passage 33. In order to prevent instability and therefore oscillation of the system when the pump 30 is in operation, that is when pressures P2 and P1 are not equal, a hysteresis term $K(P2-P1)$ is preferably introduced into operation of the valve 62 such that equation (1) becomes:

$$P3-P2<P4-P1+PM+K(P2-P1) \qquad (2)$$

the value $K(P2-P1)$ being provided by selection of suitable pressure-responsive areas of the valve 62.

In order that the supply passage 33 and pump 31 may be primed during starting the gear pump 18 (FIG. 1) is energised electrically during that period, and also enhances pressure in the system.

The low pressure servo return line 68 from the metering device 15 and shut-off valve arrangement 16 (FIG. 1) is selectively connectable to zones of the pump 30 or 31 immediately downstream of the inducer, by means of a valve 69. The valve 69 has a control element biased by a spring to connect line 68 to the pump 31. When the pump 30 is running the pressure downstream of the inducer of pump 31 rises sufficiently to move the control element against the spring and connect the line 68 to the pump 30.

FIG. 3 shows a pumping apparatus 70 which is generally similar to that disclosed in FIG. 2, corresponding parts having been assigned identical reference numerals. .The essential difference of the apparatus 70 from that of FIG. 2 is that a priming reservoir 71 is provided between the passage 39 and the pump 31. The reservoir communicates by way of a flow restrictor 72 and a valve 73 with an inlet zone of the pump 30. The valve 73 is biased open by a spring 74 and can be urged against the spring 74 by the pressure in the conduit 43. Thus during shut-down and the absence from conduit 43 of a delivery pressure from the pump 31, the pump 30 is primed from the reservoir 71, the pump 30 being connected to the inlet passage 33 by the valve 36. The orientation of the pumps 30, 31 is such that the passage 39 retains a substantial quantity of fuel. The reservoir 71 is sized so that its contents, together with the contents of the passage 39 are sufficient to prime the pump 30 and supply passage 33. In the absence of pump delivery pressure in the conduit 43 the valve element 41 will be held open by a biasing spring 75 thereby allowing the contents of the passage to effect priming.

I claim:

1. A fuel supply apparatus comprising:
a first centrifugal pump;
a second, smaller centrifugal pump;
a supply passage to said first pump,
a first delivery conduit communicating with an outlet of said second pump;
a flow metering device in said delivery conduit; and
a valve arrangement operable between first and second positions, said first position where an outlet of said first pump communicates with an inlet passage of said second pump and is isolated from said first delivery conduit, and said second position where the outlet of said first pump is isolated from the inlet passage of said second pump, the inlet of said first pump is isolated from said supply passage and the inlet passage of said second pump is connected to said supply passage, said valve arrangement including:
a first valve responsive to an increase in a pressure difference across said second pump, relative to the sum of a required metering pressure difference across said flow metering device, and to a difference between the pressure in a part of said delivery conduit downstream of said metering device and the pressure of said supply passage; and
a second valve, responsive to an increase in the pressure at the outlet of said first pump, for connecting said first pump outlet to the inlet of said second pump, and for isolating said supply passage from the inlet of said second pump.

2. An apparatus as claimed in claim 1 in which said first valve is operated by a serve pressure signal, and there is provided a third valve for delivering said servo pressure signal, said third valve being responsive to the increase in said pressure difference and to said sum of the metering pressure difference and the pressure difference between the downstream side of said metering device and said supply passage.

3. An apparatus as claimed in claim 2 which includes a second delivery conduit and a fourth valve between said first and second delivery conduits, said fourth valve being responsive to the pressures in said first delivery conduit and in said inlet passage of said second pump, for selectively interconnecting or mutually isolating said first and second delivery conduits.

4. An apparatus as claimed in claim 1 in which the inlet passage of said second pump includes a reservoir which communicates by way of a further valve with an inlet zone of said first pump, said further valve being responsive to an increase in pressure in said first delivery conduit to arrest flow between said reservoir and said first pump.

5. An apparatus as claimed in claim 3 in which said first and second delivery conduits communicate with main burners and reheat burners respectively, of a gas turbine engine.

* * * * *